United States Patent [19]

Miller et al.

[11] Patent Number: 5,027,904
[45] Date of Patent: Jul. 2, 1991

[54] RACING PLATE HORSESHOE SYSTEM WITH MOVABLE CALKS

[76] Inventors: Jack V. Miller, 700 N. Auburn Ave., Sierra Madre, Calif. 91024; Arthur Bardine, P.O. Box 1148, Arcadia, Calif. 91106

[21] Appl. No.: 487,920

[22] Filed: Mar. 5, 1990

[51] Int. Cl.$^5$ .............................................. A01L 1/04
[52] U.S. Cl. ........................................ 168/4; 168/33; 168/42
[58] Field of Search .................... 168/4, 31, 32, 33, 39, 168/42

[56] References Cited

U.S. PATENT DOCUMENTS

| | | | |
|---|---|---|---|
| 616,413 | 12/1898 | Drew | 168/32 |
| 817,583 | 4/1906 | McGann . | |
| 864,246 | 8/1907 | Kelleher | 168/31 |
| 1,101,333 | 6/1914 | Roberts | 168/33 |
| 1,315,080 | 9/1919 | Bowers . | |
| 1,390,171 | 9/1921 | Slater . | |
| 1,527,454 | 2/1925 | Walkenhorst . | |
| 3,050,133 | 8/1962 | Ketner et al. | 168/4 |

FOREIGN PATENT DOCUMENTS

| | | | |
|---|---|---|---|
| 44344 | 12/1934 | France | 168/33 |
| 2612048 | 9/1988 | France | 168/4 |

Primary Examiner—Robert P. Swiatek

[57] ABSTRACT

A racing plate horseshoe system with movable calks has an arcuate racing plate attachable to a horse's hoof. An elongated groove is provided in the lower surface and has a plurality of spaced-apart threaded holes extending from the upper surface to the groove in the lower surface. The threaded holes are provided with set screws to protect the holes during fitting the shoes. One or more screw-attached calks are mounted to the racing plate, each calk having upstanding tabs engaged into the groove and having a depending blade. The blade calk is attached to the racing plate with a screw replacing the set screw. Each calk may be mounted to the racing plate in with blade in any one of four orthogonal positions with one or more of the upstanding tabs engaged into the groove of the shoe. A preferred embodiment uses cap screws installed in the threaded hole to provide simple wear-resistant calks. Another preferred embodiment has one or more heel blocks comprising cylindrical spacers attached by screws installed into the threaded holes. The racing plate may be adapted to the track conditions and the horse's running characteristics by adding any combination of blade calks, wear calks and heel blocks.

18 Claims, 5 Drawing Sheets

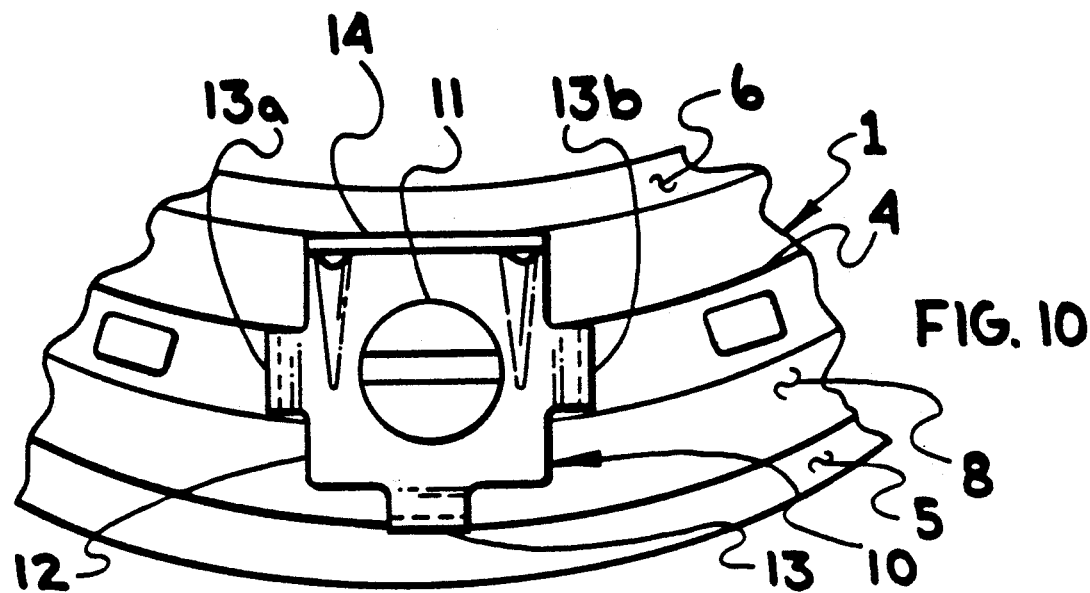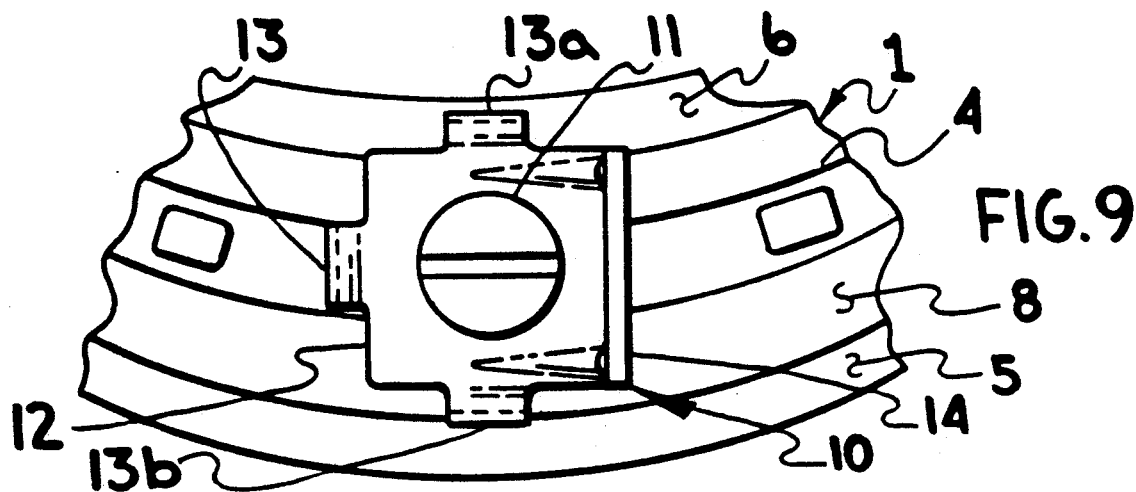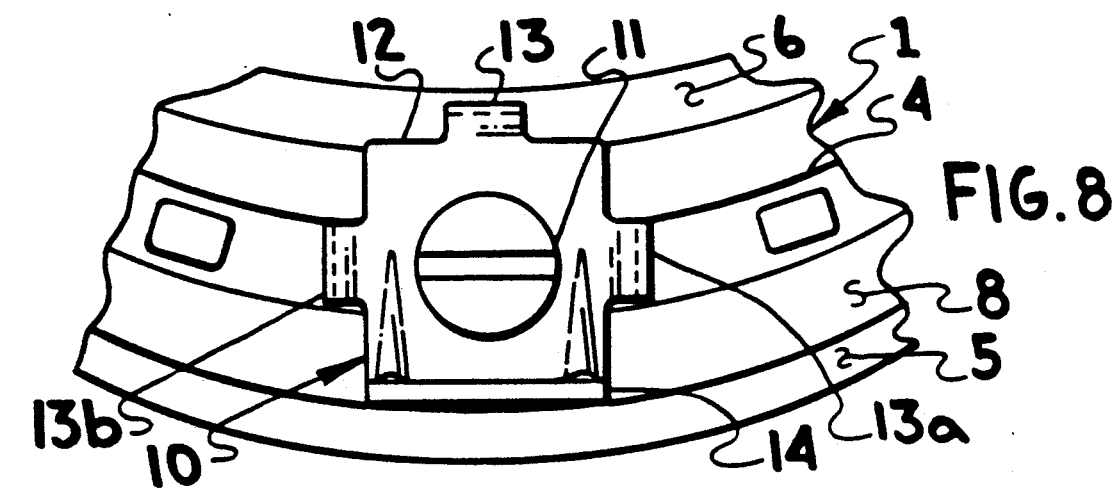

RACING PLATE HORSESHOE SYSTEM WITH MOVABLE CALKS

BACKGROUND OF THE INVENTION

This invention relates to the field of horseshoes, and more particularly to the high-performance, light-weight aluminum alloy shoes for race horses, known as racing plates.

It is necessary to provide a race horse with plates that are best suited to the conditions of the track. A trainer will change the configuration of the plates to improve the speed of a horse, just as the tires and suspension of a racing car are changed to enhance performance on the track. Therefore each horse is fitted by a "plater" (farrier) with racing plates (light-weight aluminum alloy horsehoes) to match the individual running mechanics of that specific horse to a normal running surface. If the running surface changes, that match is disturbed. Therefore as rain softens a track's consistency, it is typical for a large number of horses to be lined up at the plater's shop to have their shoes changed before racing. Then when the track dries out those same horses come back to again have their plates replaced to suit the harder surface.

Each major race track also has specifications on racing plate configurations, particularly those tracks with grass surfaces. The shoes are specified by the track stewards, and controlled by a horse shos inspector. Therefore moving a horse from one track to another may require a change of shoes, and a change from the track to the grass will certainly require a shoe change; as calks of any kind are often prohibited on grass courses. The ability to optimize the traction of the horse's hoof on each track surface by correct selection and orientation of calks may be a significant factor in winning races. Examination of hoof prints shows that every horse shoe slide along the track surface a measurable amount on every stride. As the hoof strikes the track it skids forward slightly, just as the tires of a landing jet aircraft skid and smoke until they accelerate to match the speed of the landing surface. In turns the horse's hoof tends to slide sideways slightly due to centrifugal force, in much the same manner as the tires of a race car slide outwards in a turn. In addition, as the driving hoof reaches the end of the stride it loses traction and slides backwards, flipping dirt into the air behind it, much like an accelerating knobby motorcycle tire in the dirt. Since each of the four horse shoes sequentially hits the track approximately 200 times per mile, this gives the horse at least 800 individual skids along the surface. Optimizing traction and reducing the skidding in a stride by as little as five one-thousandths of an inch (the thickness of one horse hair) can change the distance covered by 4 inches in a mile, a far greater distance that the losing margin of many races. The weight of the components of a horse shoe is also critical. Every gram attached to a horse's foot accelerates from zero to over 80 miles per hour (more than twice the nearly 40 MPH speed of the horse's body) and back to zero in every stride. Each shoe is picked up as dead weight from one hoof-print on the track, lifted about 12 inches off the ground, thrust forward approximately 26 feet and pounded down to form the next hoof-print. Again, a race horse does this weightlifting exercise more than 800 times per mile, and every extra gram is a drain on the total strength and energy that the horse can contribute to the race. That is why modern racing plates are made of light-weight aluminum alloy.

A racing plate is attached to a horse's hoof with tapered nails that are driven through a row of rectangular holes in the plate, the holes being aligned within an elongated groove or channel extending substantially around the U-shaped plate and having sufficient depth in which to recess the nail heads. The nails are driven into the hoof at an angle, whereby the point of the nails emerge from the outer hoof surface and are bent over to secure them.

The specialized aluminum-alloy racing plates usually have some pattern of steel calks that are either cast or swaged in place to engage the track surface like the cleats on an athlete's shoes. Such calks are of several types including the "toe grab", an arcuate blade around the front of the shoe; "jar calks", a short transverse blade just forward of the heel areas; "stickers", long blades parallel to the side of the shoes; and "heel blocks" that may provide elevation and traction at the heels of the shoes. Although presently-used racing plates normally have all the calks cast in place, additional traction, particulary in turns and turning maneuvers on soft running surfaces, may be added. This is done by adding steel "sticker" calks between the toe and heel for lateral friction. The added steel calks have rectangular shanks that are pounded into some of the nail holes of the plate. This is a rather crude process, and the resulting security of attachment is not reliable. Other than such added stickers, it is generally impractical to add or remove calks. Therefore the plates must removed and replaced to alter the traction. In order to change a plate, the bent-over nail points must be straightened and clipped off, and then the nails pulled to release the plate. Once the plate is removed, the new plate must be similarly installed by driving in and crimping over new nails. The farrier usually shift the new shoe to try to avoid the old nail holes, sometimes resulting in mis-aligned shoes that degrade the horse's stride. Every removal and installation damages the horse's hoof to some degree, as each nail is a source of potential damage to the hoof or foot. Frequent plate changes, which are required to optimize the horse's performance as weather and track conditions change, increases the probability that a horse may be injured.

Proir to the development of the present invention there was no practical method for changing th calk pattern without replacing the plates. Replaceable calks have been known for draft horses for many years. These fall into two general types, calks that thread directly into tapped holes in the horseshoe, such as taught by Meissner (Austria 41759) and Fairchild (Britain 210,942). These patent are simply threadably-attachable calks that have no means for orientation on the shoe. Other prior art inventions employ systems of attachable calks that use conventional machine screws for attachment, such as shown by Bowers (U.S. Pat. No. 1,315,080) and Slater (U.S. Pat. No. 1,390,171). The present invention relates to both types of screw-attached calks. The principal shortcoming of these prior-art systems is that they are all very heavy and complex, and provide for only toe and heel traction areas. They were designed for draft horses with heavy shoes, pulling in a straight line, with little regard for weight or racing conditions.

A primary purpose of the present invention is to provide a reconfigurable racing plate system in which various calks for track adaptation, wear and stride correction may be screw attached in any of several orientations in a number of locations, to provide absolute minimum weight calks that are easily attached, re-oriented or removed, and to provide calks that may be quickly and easily attached to presently available racing plate without removal of the plates from the horse's hoofs.

SUMMARY OF THE INVENTION

The achievement of the foregoing purposes of the invention is accomplished by the present invention in which a racing plate horseshoe system with movable calks is attachable to a horse's hoof and has an outer rim, an inner rim, an upper surface adjacent the hoof and a lower surface. An elongated groove is provided in the lower surface, has a plurality of nail holes through the plate, and also has a plurality of spaced-apart threaded holes extending through the plate. One or more calks are screwed to said racing plate by engagement of screws through the calks and into the threaded holes. In a preferred embodiment a blade-type calk is provided with a generally rectangular planar base having upstanding and orthogonal tabs on three sides of the base, a depending blade on the fourth side of the base and a central screw hole through the base for a screw attaching the calk to the racing plate, with one or two upstanding tabs of the calk engaged into the lower surface groove. Each blade calk may be mounted to the racing plate in with the blade in any one of four orthogonal positions with one or two tabs engaged into the groove.

In the preferred embodiment the tabs and blade are formed of a single piece of stamped sheet metal. The depending blade of the calk is stiffened by integrally-formed stiffeners in the form of ribs or is stiffened by having an arcuate cross section. These blade calks may be used as toe grabs, jar calks or stickers. Another preferred embodiment uses several rounded, button-head cap screws installed in the threaded holes to provide simple, low-profile wear-resistant calks. Yet another preferred embodiment uses hex-head cap machine screws installed in the threaded holes to provide cleat-type traction calks on hard or frozen surfaces. Still another preferred embodiment has one or more heel blocks comprising cylindrical spacers attached by screws installed into the threaded holes. By all these foregoing options, the shoe may be provided with virtually any combination of calk configurations, sizes and orientations to precisely match the running mechanics of the horse to the conditions of the track.

Very aggressive traction calks can be attached to the plates for racing under any track conditions. However, such calks would not be appropriate for general use, training, or in the stall or paddock. Therefore, after the race the calks may be replaced with a complement of wear cap screws, to prevent the horse from accidental injury to himself, others or the stall. This not only enhances safety, but extends the life of the plates. The wear cap screws are vary close to the weight of the calks they replace, so the horse does not sense a significant weight change on the hoofs as the training or paddock configuration is modified for a race.

The racing plate system of the present invention not only provides the benefits of changing the plate configuration without replacing the shoes, but also provides traction inserts that are approximately 40% lighter in weight than the existing cast-in-place calks. This weight saving provides a significant performance advantage over presently availably racing plates, as well as over any shown in known prior art patents.

BRIEF DESCRIPTION OF THE DRAWINGS

FIG. 8 is a plan view of the underside of a blade calk, and showing the calk blade aligned with the outer rim of a racing plate.

FIG. 9 is plan view of the underside of a blade calk, showing the calk blade oriented transversely to the outer rim of a racing plate.

FIG. 10 is a plan view of the underside of a blade calk, showing the calk blade aligned with the inner rim of a racing plate.

DETAILED DESCRIPTION OF THE DRAWINGS

Figure 1:
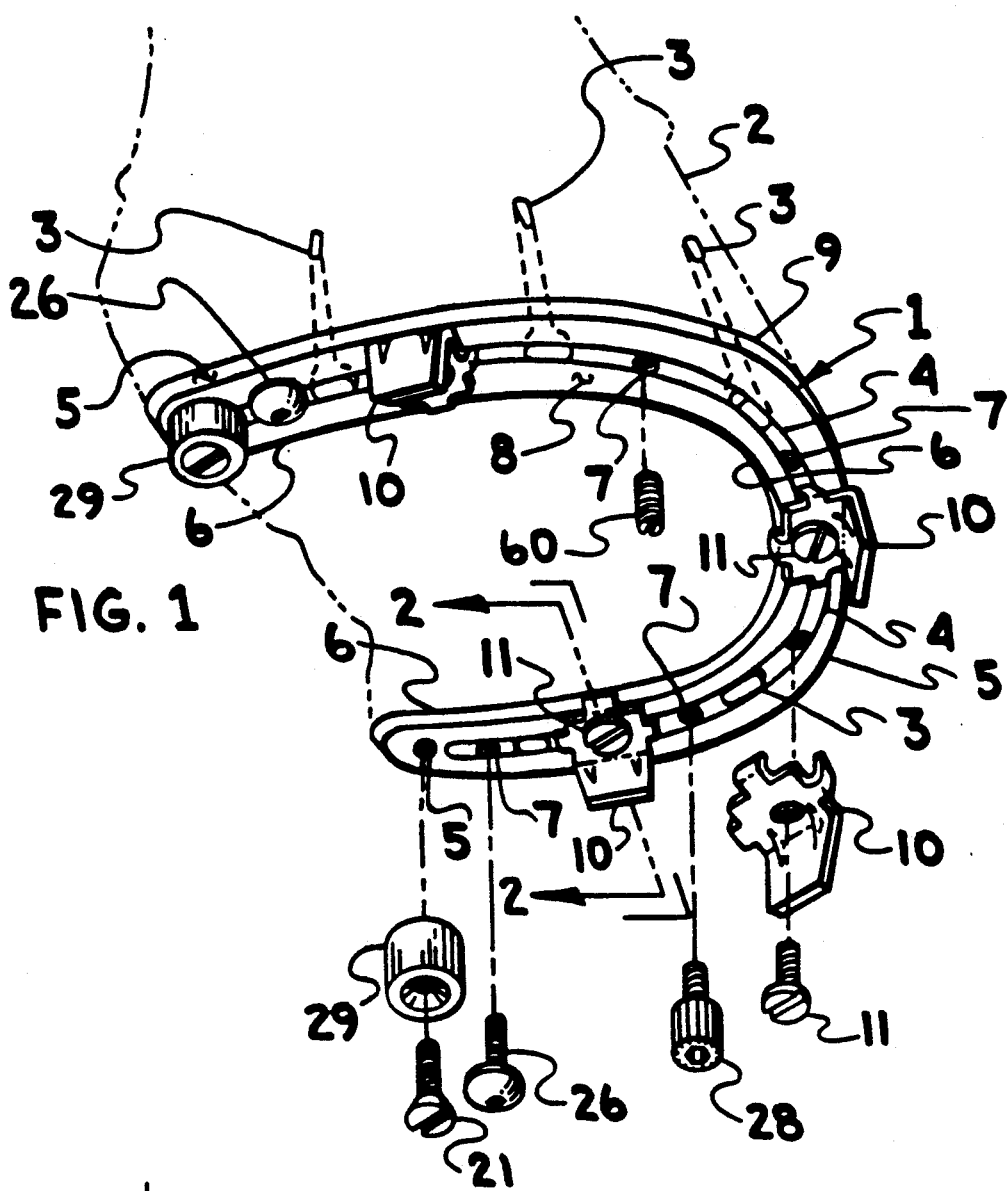
FIG. 1 shows shows a perspective view of the underside of a horse's hoof with an attached racing place including a plurality of calks of several preferred embodiments, constructed and attached according to the present invention.

In FIG. 1 a generally arcuate racing plate 1 is shown attached to a horse's hoof 2 with a plurality of horseshoe nails 3 passing through the plate and driven through and clinched over a portion of the hoof 2. The nail heads are recessed in an elongated arcuate groove 4 disposed between an outer rim 5 and an inner rim 6 on lower surface 8. Plate 1 also provided with a plurality of threaded holes 7 therethrough. A number of first preferred embodiment movable blade calks 10 may be attached to the racing plate by screws 11 engaged into threaded holes 7 in plate 1. A number of wear-extending calks 26, shown as button head screws, and 28 in the form of internal-hex head cap screws, may be screwed into any of the threaded holes 7 to provide varying degrees of traction. In addition, one or more heel blocks 29, in the form of tubular, light-weight aluminum-alloy spacers, may be attached to the shoe by screws 21. By use of any or all of the foregoing calks a racing plate may be configured with virtually any degree of traction desired. Prior to the installation of any of the calks the threaded holes 7 in the shoe are fitted with headless set screws 60. These set screws prevent distortion of the threaded holes while the shoe is being fitted to the horse's hoof. Set screws are retained in any unused threaded holes to keep the holes clean and clear of dirt, mud, etc. Any of the remaining set screws may then be later removed in order to install additional calk.

Figure 2:
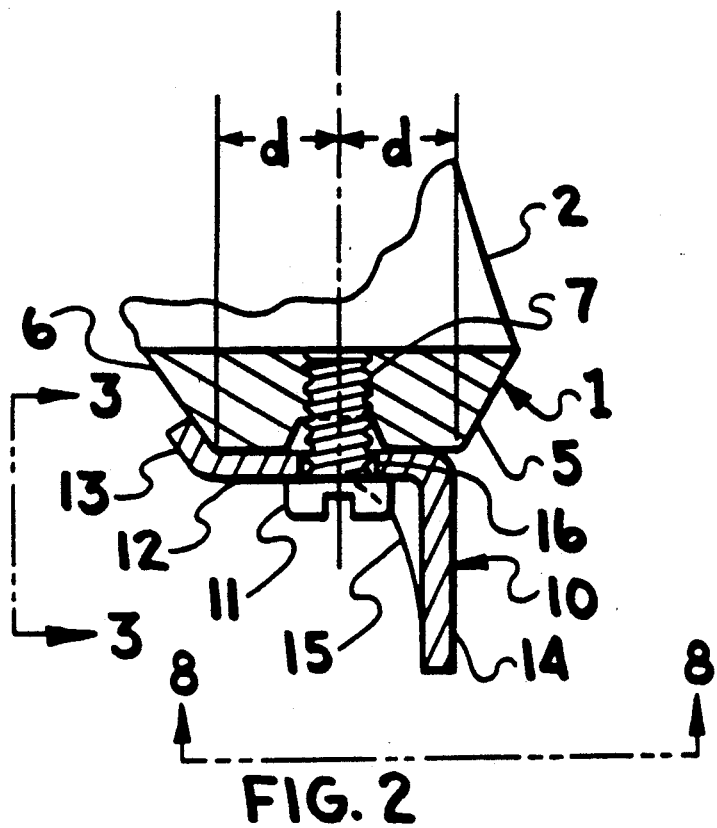
FIG. 2 is a side elevation sectional view of a blade-type calk of FIG. 1, taken along section line 2—2 of FIG. 1.

In FIG. 2 a blade calk 10 is shown attached to plate 1 with screw 11 installed into threaded hole 7. Calk 10 has a generally planar base 12 which is contiguous with an upstanding tab 13, spaced a distance "d" from the centerline of screw clearance hole 16. Distance "d" is also the distance from the screw centerline to either the outer rim 5 or the inner rim 6 of the plate. Base 12 also supports a depending blade 14 which is additionally shown supported by rib 15. Blade calks are made of a light-weight aluminum alloy, usually 2024-T4 being preferred. The calks are die-formed in the annealed condition, and then heat treated to the T4 condition for maximum strength and stiffness. Other alloys, including ferrous materials, beryllium, magnesium or titanium alloys may be used, but the preferred aluminum material has been shown to provide excellent properties of strength, wear, manufacturability and cost.

Figure 3:
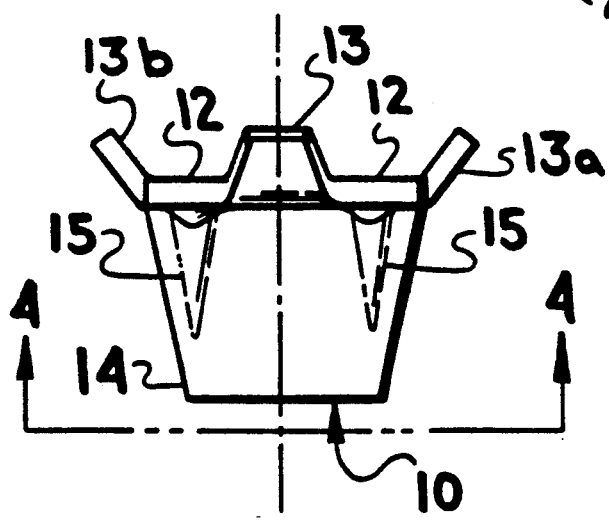
FIG. 3 is an elevation view of the blade calk of FIG. 2, taken at view line 3—3 of FIG. 2.

In FIG. 3 calk 10 is shown not attached to the plate and having rectangular base 12 termination at upstanding tabs 13a and 13b, shown having an obtuse angle with respect to base 12. Blade 14 is depending from base 12, and is supported by two ribs 15.

Figure 4:
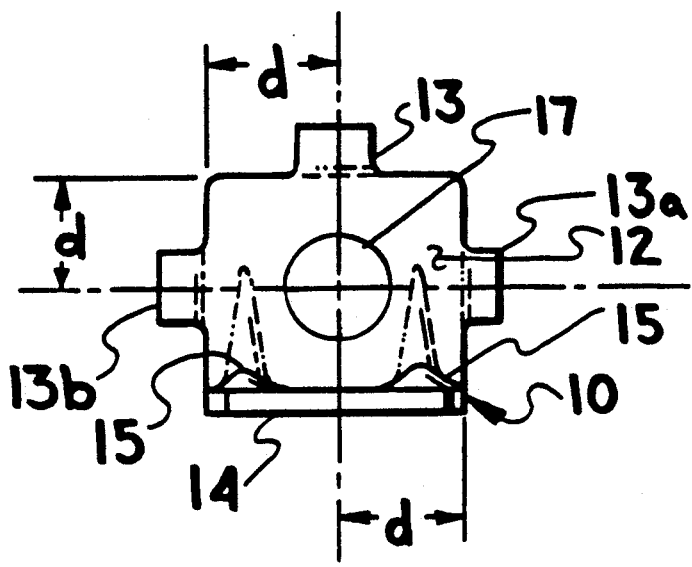
FIG. 4 is a plan view of the underside of a blade calk, taken at view line 4—4 of FIG. 3.

In FIG. 4 calk 10 is shown in plan view and has base 12 attached as a contiguous piece of metal to upstanding orthogonal tabs 13, 13a and 13b on three sides, spaced distance "d" from the centerline of screw hole 17, which coincides with the distance "d" shown in FIG. 2. Depending blade 14 is also orthogonal on the fourth side of base 12 and is additionally supported by ribs 15.

Figure 5:
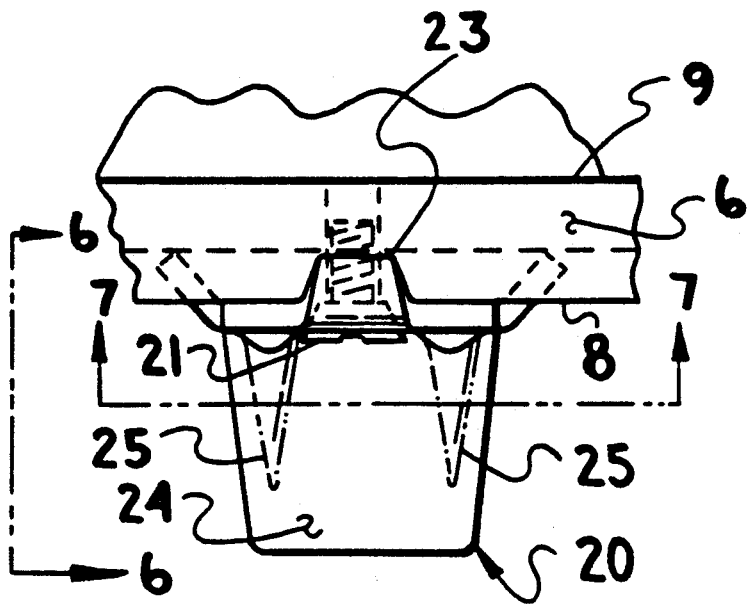
FIG. 5 is a side elevation view of another preferred embodiment of a blade calk, adapted to be retained by a flat head screw.

In FIG. 5 an alternate embodiment calk 20 is shown in elevation view attached to upper surface 8 of plate 1, and has base 22 attached as a contiguous piece of metal to upstanding tab 23 which is shown resting against inner rim 6. Calk 20 is shown attached to shoe 1 with a flat head screw 21. Depending blade 24 is also contiguous with base 22 and is supported therefrom by ribs 25. The alternate embodiment of FIG. 5 is similar to that shown in FIG. 3 except for being adapted for the use of a flat head screw 21 for attachment to the plate 1. In practice, flat head screw 21 is slightly lighter in weight than the wear-resistant cap screws 26 or Allen-head cleat screws 28, so that the flat head screw 26, plus the light-weight aluminum blade calk 20 is approximately the same weight (within ½ gram) as either screw 26 or 28. This keeps the weight of the shoe nearly constant, so the horse trains and runs every race with the same weight on each respective hoof.

Figure 6:
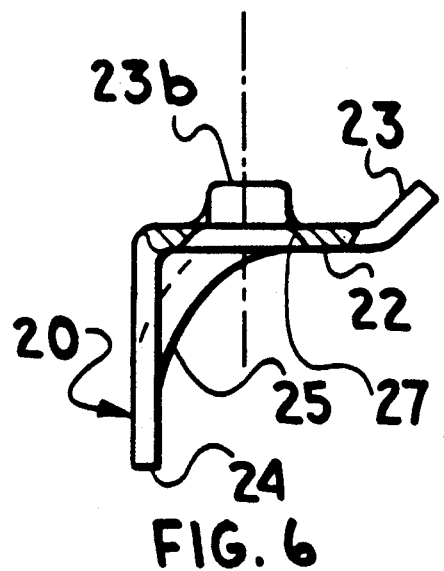
FIG. 6 is is an elevation view of a blade calk, taken at view line 6—6 of FIG. 5.

FIG. 6 calk 20 is shown detached from the plate and having rectangular base 22 terminating at upstanding tabs 23 and 23b. Blade 24 is depending from base 22, and in supported by ribs 25. A countersunk screw hole 27 is shown in a partial section.

Figure 7:
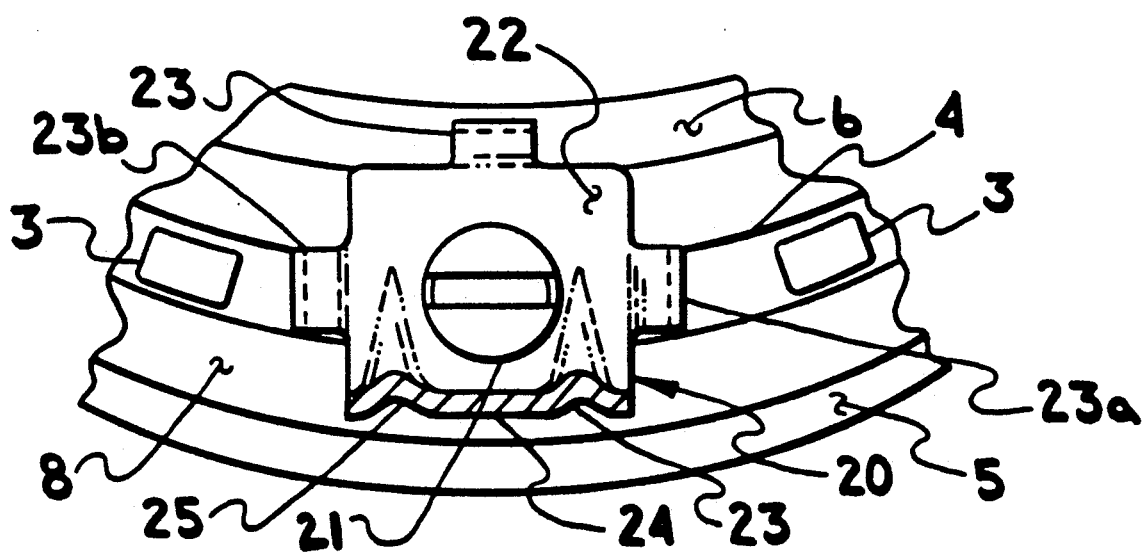
FIG. 7 is a cross sectional view of a blade calk, taken at view line 7—7 of FIG. 5 and showing the calk blade aligned with the outer rim of a racing plate.

In FIG. 7 calk 20 is shown in a sectional plan view taken along section line 7—7 of FIG. 5 and has base 22 attached as a contiguous piece of metal to upstanding orthogonal tab 23 resting against inner rim 6, and tabs 23a and 23b engaged into groove 4 of lower surface 8. Depending blade 24 is also orthogonal and contiguous with base 22 fastened to plate 1 with screw 21, whereby blade 24 is parallel to and adjacent to outer rim 5. Blade 24 is additionally supported by intergrally-formed ribs 25 from base 22.

In FIG. 8 calk 10 is shown in a plan view taken along the view line 8—8 of FIG. 2, and attached to plate 1 with screw 11. Calk 10 has upstanding orthogonal tab 13 resting against inner rim 6 and tabs 13a and 13b engaged into groove 4 of lower surface 8 whereby depending blade 14 is tangent to outer rim 5.

In FIG. 9 calk 10 is shown in a plan view and attached to plate 1 with screw 11, and rotated 90° from the position shown in FIG. 9. Calk 10 and has base 12 tab 13a resting against inner rim 6 and tab 13 engaged into groove 4 of lower surface 8, whereby depending blade 14 is perpendicular to outer rim 5 and inner rim 6.

In FIG. 10 calk 10 is shown in a plan view and attached to plate 1 with screw 11, and rotated 90° from the position shown in FIG. 10. Calk 10 has upstanding orthogonal tab 13 resting against outer rim 5 and tabs 13a and 13b engaged into groove 4 of lower surface 8 whereby depending blade 14 is tangent to and adjacent to inner rim 6.

Figure 11:
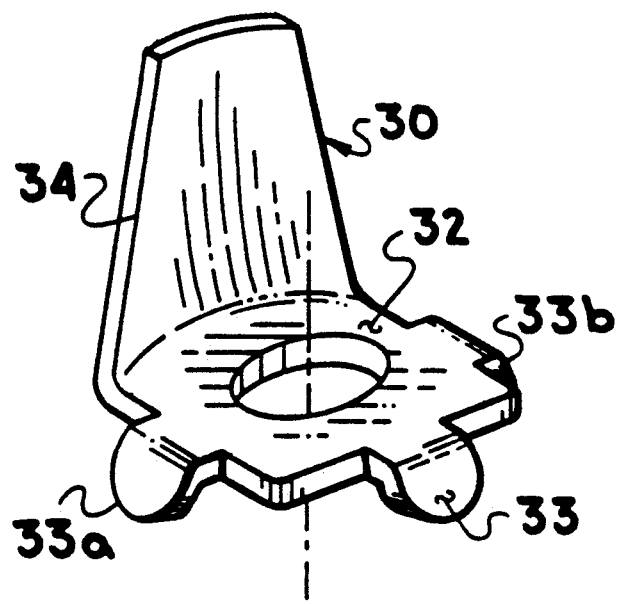
FIG. 11 is a perspective view of a blade calk of a second preferred embodiment, having a long arcuate depending blade.

In FIG. 11 a third preferred embodiment arcuate blade calk 30 is shown having a relatively high profiled blade 34. In FIG. 11 calk 30 is shown not attached to the plate and having rectangular base 32 terminating at upstanding tabs 33, 33a and 33b, shown having an obtuse angle with respect to base 32. Blade 34 is depending from base 32, and has an arcuate form.

Figure 12:
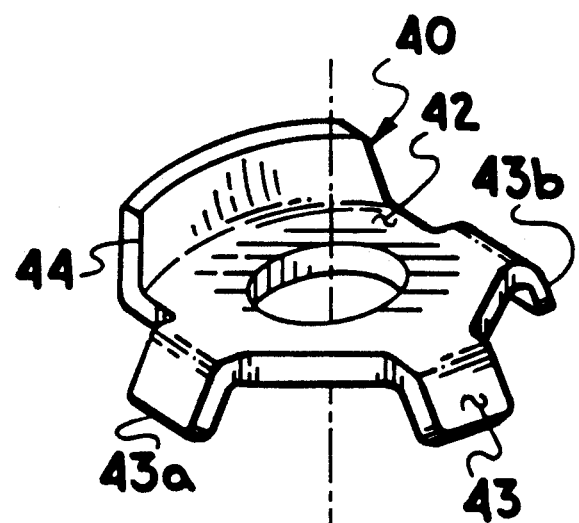
FIG. 12 is a perspective view of a blade calk of a second preferred embodiment, having a short arcuate depending blade.

In FIG. 12 a fourth preferred embodiment arcuate blade calk 40 is shown having a relatively low profile depending blade 44 and having rectangular base 42 terminating at upstanding tabs 43, 43a and 43b. Depending blade 44 is also orthogonal to and contiguous with base 42.

Figure 13:
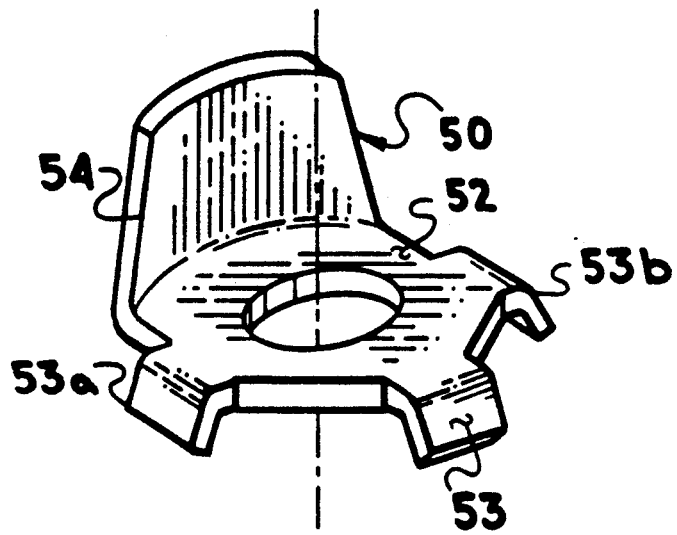
FIG. 13 is a perspective view of a blade calk of a second preferred embodiment, having an intermediate length arcuate depending blade.

In FIG. 13 a fifth preferred embodiment arcuate blade calk 50 is shown having an intermediate height profile blade 54. Calk 50 is attached as a contiguous piece of metal to with base 52, which also has upstanding orthogonal tabs 53, 53a and 53b.

The blade heights shown for arcuate calks 30, 40 and 50 of FIG. 11, 12 and 13 are equally applicable to the flat, rib-reinforced blade calks 10 of FIGS. 2 through 10.

Referring again to FIG. 1, in use a number of blade calks 10 which are attachable with cap screws 11, are interchangeable with calks 20 which are attachable with flat head screws 21, or arcuate blade calks 30, 40 or 50. Any blade calk may be attached by removing the set screw 60 and attaching the desired calk with a cap screw 11 or flat head screw 21 to any of the threaded holes 7 in plate 1. Any of the blade calks may be installed in any of four orthogonal orientations in any of the screw hole locations. Blade calks may be added, removed and oriented as desired. In addition to the blade calks, wear-extending screw calks 26 or 28, or heel blocks 29 may be attached with flat head screws 21. Blade calks may also be attached by using any of the wear-extending screws to provide any degree of traction and lift required to best suit the combination of track conditions and horse's running characteristics.

This preset invention eliminates the need to change the horse's racing plates each time the weather changes the track surface, or each time the horse is moved to a different running surface, such as grass or turf. This reduces the stress added to a race horse caused by being worked on by a farrier before a race, and also can greatly reduce physical injury to the hoofs of the horse from frequent shoeing.

In addition to the traction variations, the varsatility of calks within the present invention provides the horse trainer with the ability to make adjustments of the side-to-side and toe-to-heel angles of the horse's hoofs on the running surface. This permits the correction of running action faults to optimize the performance and competitiveness of the horse. The ability to optimize the traction of the horse's hoof on the track by correct selection and orientation of calks according to the present invention may also be a significant factor in winning a race.

The light-weight components of the present invention provide a substantial weight reduction over the steel calks, such as insertable stickers and cast-in-place toe grabs presently used in prior art aluminum alloy racing plates. The ability in the present invention to substitute a traction calk for a wear cap calk of virtually equal weight provides for more consistent running mechanics for horse, both between training conditions and racing, and from changing tracks.

We claim:

1. A racing plate horseshoe system with movable calks including:
   a generally arcuate racing plate attachable to a horse's hoof and having an outer rim, an inner rim, an upper surface adjacent the hoof and a lower surface;
   an elongated groove in the lower surface, disposed between the inner and outer rims and including a plurality of spaced-apart apertures therethrough for a plurality of shoe-attaching nails, wherein the groove is only of sufficient width and depth to accommodate the nail heads;
   the elongated groove also including a plurality of spaced-apart threaded holes having diameters substantially the width of the groove and extending from the upper surface to the groove in the lower surface; and
   one or more calks mounted to said racing plate, said one or more calks being threadably engaged into threaded holes and mechanically engaged into the groove and depending from the lower surface of the plate.

2. A racing plate horseshoe system with movable calks according to claim 1 in which a portion of the threaded holes have calks threadably engaged therein, and one or more remaining threaded holes are plugged with headless set screws extending between the upper and lower surface.

3. A racing plate horseshoe system with movable calks according to claim 1 in which the threaded holes are plugged with mating screws during a shoeing process involving bending and forming the plate to match the foot of a horse.

4. A racing plate horseshoe system with movable calks according to claim 1 in which one or more of the calks are cap screws installed into the threaded holes, said cap screws having screw heads depending from the lower surface of the plate.

5. A racing plate horseshoe system with movable calks according to claim 1 in which one or more of the calks are cap screws installed into the threaded holes, said cap screws having screw heads depending from the lower surface of the plate and said screw heads retaining tubular spacers disposed about the screws.

6. A racing plate horseshoe system with movable calks according to claim 1 including one or more screw-attached calks mounted to said racing plate, each having one or more upstanding tabs engaged into the lower surface groove and each having a depending blade.

7. A racing plate horseshoe system with movable calks according to claim 6 in which each screw-attached calk is provided with a generally rectangular planar base having one upstanding and orthogonal tab on each of three sides of the base, a depending blade on the fourth side of the base, a central screw hole through the base and a screw attaching the calk to the racing plate.

8. A racing plate horeshoe system with movable calks according to claim 7 in which the screw-attached calk may be mounted to the racing plate in with the depending blade in any one of four orthogonal positions while having one or more tabs engaged into the groove.

9. A racing plate horseshoe system with movable calks according to claim 7 in which the screw-attached calk has one or more stiffening ribs extending from the rectangular base to the depending blade.

10. A racing plate horseshoe system with movable calks according to claim 7 in which the base, tabs and blade of the screw-attached calk are contiguously formed of a single piece of metal.

11. A racing plate horseshoe with movable calks according to claim 7 in which the hole through the base is countersunk, and the attachment screw is a flush flat-head screw.

12. A racing plate horseshoe system with movable calks according to claim 7 in which the depending blade has an arcuate shape in plan view, and forms an arcuate contiguous junction with the planar base.

13. A racing plate horseshoe system with removable calks according to claim 7 in which the screw-attached calk is made of a non-ferrous metal alloy from the group including aluminum, magnesium, beryllium and titanium.

14. A racing plate horseshoe system with removable calks according to claim 10 or 13 in which the metal in formed in an annealed condition and heat treated to a tempered condition after forming.

15. A racing plate horseshoe system with movable calks including:
   a generally arcuate racing plate attachable to horse's hoof and having an outer rim, an inner rim, an upper surface adjacent the hoof and a lower surface;
   an elongated groove in the lower surface, disposed between the inner and outer rims;
   a plurality of spaced-apart threaded holes extending from the upper surface to the groove in the lower surface;
   one or more screw-attached calks mounted to said racing plate, each having one or more upstanding tabs engaged into the lower surface groove and each having a depending blade; and
   one or more threadably-attached calks mounted to said racing plate, each comprising a circular head having a threaded attachment stud.

16. A racing plate horseshoe system with removable calks according to claim 15 in which at least one of the threadably-attached calks is a button-head cap screw.

17. A racing plate horseshoe system with removable calks according to claim 15 in which at least one of the threadably-attached calks is a internal-hex head machine screw.

18. A racing plate horseshoe system with removable calks according to claim 15 in which each of the screw-attached calks is attached with a flat-head screw, and the combined weight of said calk and flat-head screw is approximately the same weight as one of the said threadably-attached calks.

* * * * *